US009216463B2

(12) United States Patent
Hecht (10) Patent No.: US 9,216,463 B2
(45) Date of Patent: Dec. 22, 2015

(54) CUTTING TOOL AND CUTTING INSERT HAVING EXACTLY THREE CUTTING PORTIONS THEREFOR

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 407 days.

(21) Appl. No.: 13/733,717

(22) Filed: Jan. 3, 2013

(65) Prior Publication Data
US 2014/0186130 A1     Jul. 3, 2014

(51) Int. Cl.
*B23B 27/04*     (2006.01)
*B23B 27/16*     (2006.01)
*B23C 5/20*     (2006.01)
(Continued)

(52) U.S. Cl.
CPC .............. *B23C 5/207* (2013.01); *B23B 27/007* (2013.01); *B23B 27/04* (2013.01); *B23B 27/145* (2013.01); *B23B 29/043* (2013.01); *B23B 27/16* (2013.01); *B23B 2200/049* (2013.01); *B23B 2200/0419* (2013.01); *B23B 2200/121* (2013.01); *B23B 2200/369* (2013.01); *B23B 2205/12* (2013.01); *B23B 2220/123* (2013.01); *B23C 2220/36* (2013.01); *Y10T 407/22* (2015.01); *Y10T 407/2268* (2015.01); *Y10T 407/2272* (2015.01);
(Continued)

(58) Field of Classification Search
CPC .... B23B 27/04; B23B 27/08; B23B 27/1614; B23B 27/1662; B23B 2200/0423; B23B 2200/161; B23B 2200/0419; Y10T 407/25; Y10T 407/23; Y10T 407/2274; Y10T 407/2276; Y10T 407/2272

USPC .................... 407/117, 113, 102–104
See application file for complete search history.

(56) References Cited

U.S. PATENT DOCUMENTS 4,461,602 A     7/1984     Zettl
4,755,085 A     7/1988     Murén et al.
(Continued)

FOREIGN PATENT DOCUMENTS

DE     102008027009 A1 *  12/2009     .............. B23B 27/16
EP     2471618 A1     7/2012
(Continued)

OTHER PUBLICATIONS

International Search Report dated Feb. 26, 2014 issued in PCT counterpart application (No. PCT/IL2013/050994).

*Primary Examiner* — Sunil K Singh
*Assistant Examiner* — Ryan Rufo
(74) *Attorney, Agent, or Firm* — Womble Carlyle Sandridge & Rice PLLC (57) ABSTRACT

In a cutting tool having an indexable cutting insert with three cutting portions, the cutting insert is removably securable to an insert holder by means of a fastener. The cutting insert has two opposing end surfaces with a peripheral side surface extending therebetween. At least one end surface has a central boss protruding therefrom with a raised support surface, and the peripheral side surface has three abutment recesses. In an end view of the cutting insert, each of the three abutment recesses is visible and located inside a first imaginary circle circumscribing the visible central boss. A holding portion of the insert holder has a seating surface with at least one protuberance protruding therefrom. The support surface is in clamping contact with the seating surface, and exactly two of the three abutment recesses are engaged with the at least one protuberance.

45 Claims, 5 Drawing Sheets

(51) Int. Cl.
*B23B 27/00* (2006.01)
*B23B 27/14* (2006.01)
*B23B 29/04* (2006.01)

(52) U.S. Cl.
CPC .......... *Y10T 407/2274* (2015.01); *Y10T 407/23* (2015.01); *Y10T 407/235* (2015.01)

(56) References Cited

U.S. PATENT DOCUMENTS

| | | | |
|---|---|---|---|
| 5,004,379 A * | 4/1991 | Little | 407/113 |
| 5,032,050 A | 7/1991 | Niebauer et al. | |
| 5,607,263 A | 3/1997 | Nespeta et al. | |
| 6,877,934 B2 * | 4/2005 | Gainer | 407/49 |
| D526,339 S * | 8/2006 | Shanley | D15/139 |
| 7,296,953 B2 * | 11/2007 | Kuenzel | 408/83 |
| 7,597,508 B2 | 10/2009 | Hecht | |
| 2007/0231089 A1 * | 10/2007 | Hecht | 407/113 |
| 2008/0152441 A1 * | 6/2008 | Andersson et al. | 407/103 |
| 2010/0329800 A1 | 12/2010 | Edler et al. | |
| 2011/0020080 A1 * | 1/2011 | Zettler | 407/113 |
| 2012/0099935 A1 | 4/2012 | Hecht | |
| 2013/0089381 A1 * | 4/2013 | Morgulis | 407/103 |
| 2013/0108387 A1 * | 5/2013 | Ishi et al. | 409/132 |
| 2013/0257961 A1 | 10/2013 | Itogawa | |
| 2013/0309027 A1 | 11/2013 | Chistyakov | |

FOREIGN PATENT DOCUMENTS

| | | | | |
|---|---|---|---|---|
| FR | 1561415 A * | 3/1969 | | B23B 27/08 |
| JP | 06-218626 A * | 8/1994 | | B23B 27/16 |
| JP | 2005-074531 | 3/2005 | | |
| JP | 2006-167818 A * | 6/2006 | | B23B 27/14 |
| JP | 2007-144572 A * | 6/2007 | | B23B 27/14 |
| SU | 1407688 A1 | 7/1988 | | |

* cited by examiner

CUTTING TOOL AND CUTTING INSERT HAVING EXACTLY THREE CUTTING PORTIONS THEREFOR

FIELD OF THE INVENTION

The present invention relates to metal cutting tools for use in groove turning and groove milling operations having an indexable cutting insert with a plurality of cutting portions.

BACKGROUND OF THE INVENTION

Within the field of metal cutting tools used in groove turning and groove milling operations, cutting inserts removably securable in an insert holder have long since provided a way of performing a cutting operation with a suitably hard material, i.e. cemented carbide, in the vicinity of the cutting edge, where the insert holder, manufactured from a less hard material, is reusable following the disposal of a worn or damaged cutting insert.

This type of cutting tool has been further developed to utilize indexable cutting inserts with an increased number of cutting edges, giving economic benefits from providing an increased number of cutting operations per cutting insert. This type of cutting tool has also been developed to provide a more efficient means of securing the indexable insert to the insert holder.

U.S. Pat. No. 4,461,602 discloses a milling cutter consisting of a shaft, a cutter plate and a screw bolt by means of which the cutter plate is detachably fastened at the front end of the shaft. The latter has a recess in the front face thereof. The recess is defined by three planar side faces leaving a peripheral gap between each pair thereof. The cutter plate substantially formed triangularly is fitted in the recess for being immovable in a radial plane. Protrusions of the cutter plate protrude through the gaps and are provided with a cutting edge respectively.

U.S. Pat. No. 5,607,263 discloses a cutting plate having a disk-shaped body with three teeth and a single integrally formed projection. The holder has a front-face recess which is encompassed all around by a wall of the holder. As shown in FIGS. 5 and 6 of U.S. Pat. No. 5,607,263, the projection has a coupling surface with the contour of a triangular convex polygon and the recess has a counter-surface with the contour of a triangular concave polygon, and in a loaded state three contact zones are formed between the coupling surface and the counter-surface.

SUMMARY OF THE INVENTION

In accordance with the present invention, there is provided an indexable cutting insert comprising two opposing end surfaces with a peripheral side surface and a central axis extending therebetween, a median plane located between the two opposing end surfaces, exactly three cutting portions, each cutting portion having a major cutting edge extending from one end surface to the other end surface, exactly three abutment recesses in the peripheral side surface, and a central boss protruding from at least one of the two opposing end surfaces, wherein each central boss has a raised support surface located axially further away from the median plane than any point on the three major cutting edges located on the same side of the median plane, and wherein in an end view of the cutting insert each of the three abutment recesses is visible and located inside a first imaginary circle circumscribing the central boss.

Also in accordance with the present invention, there is provided a cutting tool comprising an insert holder, and at least one cutting insert of the sort described above retained therein.

The insert holder has a holding portion extending along a longitudinal tool axis, the holding portion having a seating surface transverse to the longitudinal tool axis, with at least one protuberance protruding from the seating surface, the at least one cutting insert being removably securable to the insert holder by means of a fastener, wherein exactly one cutting portion of each cutting insert is operative, wherein one support surface of each cutting insert is in clamping contact with the seating surface, and wherein exactly two of the three abutment recesses of each cutting insert are engaged with the at least one protuberance.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Attention is first drawn to FIGS. 1 to 5, showing an indexable cutting insert 20 which may be manufactured by form pressing and sintering a cemented carbide, such as tungsten carbide, and may be coated or uncoated.

According to the present invention, the cutting insert 20 has two opposing end surfaces 22 with a peripheral side surface 24 and a central axis A1 extending therebetween, and exactly three cutting portions 26.

In some embodiments of the present invention, the cutting insert 20 may be indexable about the central axis A1.

According to the present invention, the peripheral side surface 24 has exactly three abutment recesses 28, and each of the three cutting portions 26 has a major cutting edge 30 extending from one end surface 22 to the other end surface 22.

Figure 1:
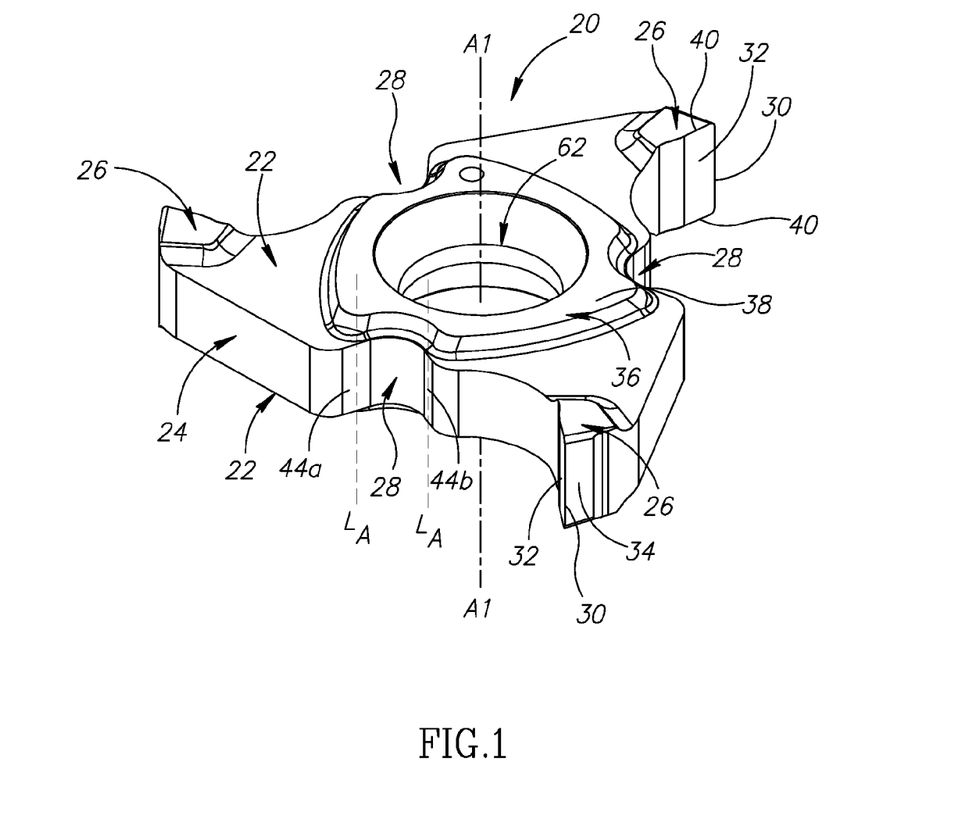
FIG. 1 is a perspective view of a cutting insert in accordance with some embodiments of the present invention.
Figure 4:
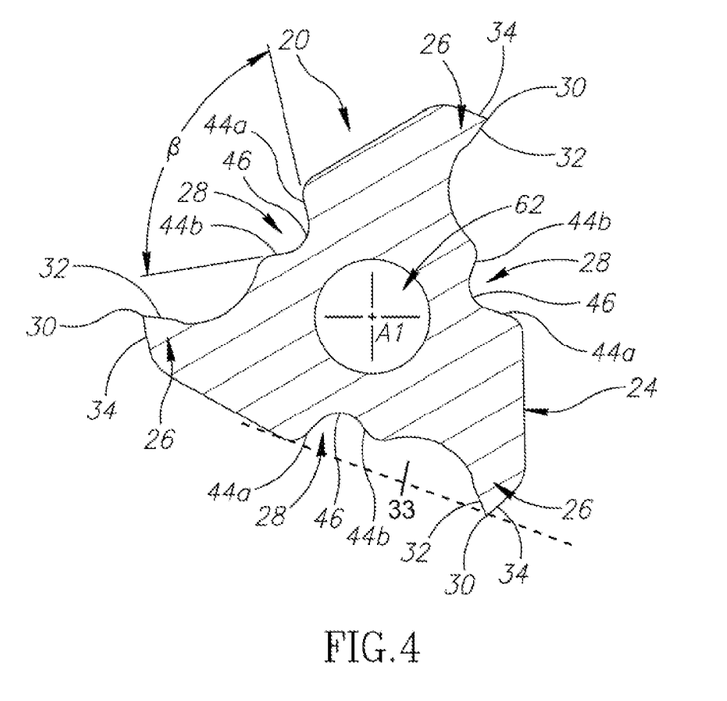
FIG. 4 is a cross-sectional view of the cutting insert shown in FIG. 3, taken along the line IV-IV.

In some embodiments of the present invention, as shown in FIGS. 1 and 4, each of the three major cutting edges 30 may be formed by the intersection of a rake surface 32 and a clearance surface 34, and the rake and clearance surfaces 32, 34 may be located on the peripheral side surface 24. As seen in FIG. 4, at least a portion of each of abutment recess 28 may be formed within a peripheral recess 33 which includes the rake surface 32 of an associated major cutting edge 30.

Also, in some embodiments of the present invention, the three cutting portions 26 may be circumferentially equally spaced about the central axis A1 alternating with the three abutment recesses 28.

Further, in some embodiments of the present invention, the three cutting portions 26 may be circumferentially and radially spaced apart from the three abutment recesses 28.

Yet further, in some embodiments of the present invention, all of the three cutting portions 26 may be identical.

Yet still further, in some embodiments of the present invention, all of the three abutment recesses 28 may be identical.

It should be appreciated that use of the terms "radially" and "axially" throughout the description and claims refers to the positioning of elements of the cutting insert 20 with respect to the central axis A1.

Figure 2:
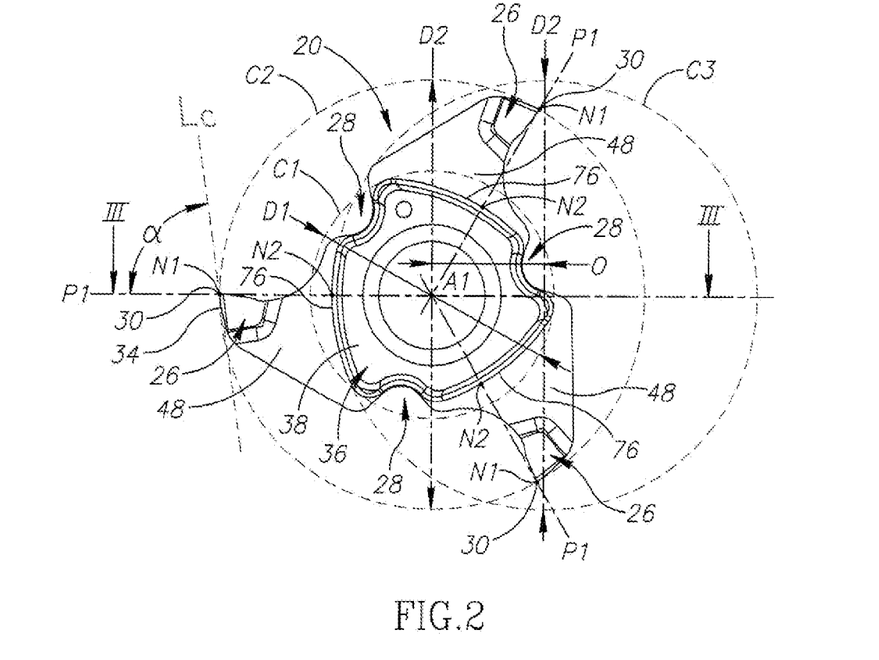
FIG. 2 is an end view of the cutting insert shown in FIG. 1.

As shown in FIG. 2, the cutting insert 20 may exhibit rotational symmetry about the central axis A1.

Figure 3:
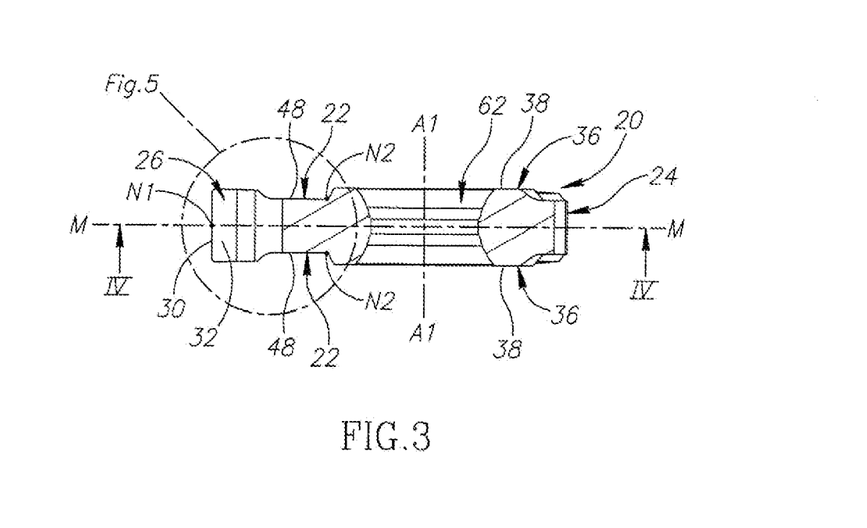
FIG. 3 is a cross-sectional view of the cutting insert shown in FIG. 2, taken along the line III-III.

In some embodiments of the present invention, as shown in FIG. 2, each of the three cutting portions 26 may have a radial plane P1 containing the central axis A1 and a first point N1 on its respective major cutting edge 30. As best seen from the end view of FIG. 2 and FIG. 3 showing the cross-section of FIG. 2 along the radial plane P1, at least a portion of the rake surface 32 of each cutting portion 26 is located on the same side of its respective radial plane P1 as the adjacent clearance surface 34.

Also, in some embodiments of the present invention, as shown in FIG. 2, each radial plane P1 may form an acute internal clearance angle $\alpha$ with a straight imaginary clearance line $L_C$ tangential to the clearance surface 34 immediately adjacent its respective first point N1, and the acute clearance angle $\alpha$ may have a value equal to or greater than 75 degrees, i.e. $\alpha \geq 75°$.

Configuring the cutting insert 20 to have clearance angles $\alpha$ equal to or greater than 75 degrees advantageously provides robust support for the operative cutting edge 30 during internal groove turning operations.

It should be appreciated that use of the terms "internal angle" and "external angle" throughout the description and claims refers to an angle between two planar and/or linear components as measured internal and external to the member on which these components are formed, respectively.

Figure 5:
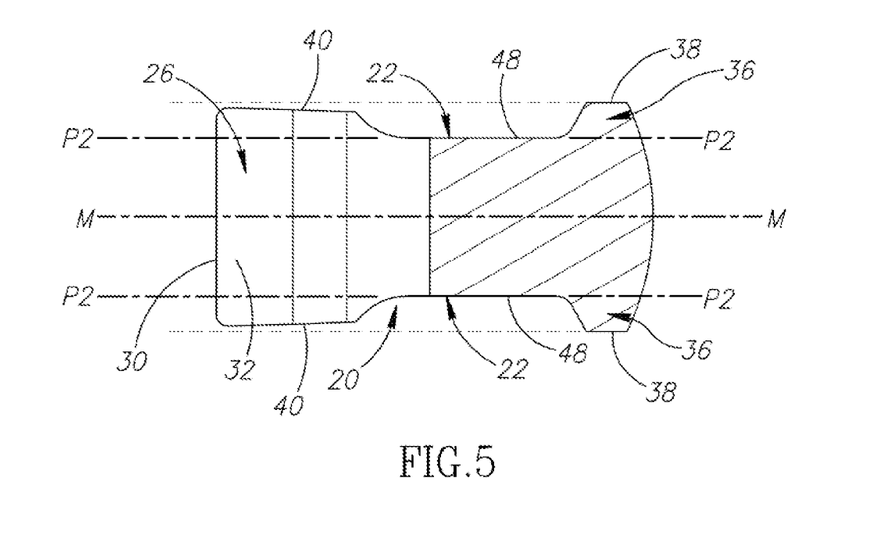
FIG. 5 is a detailed view of the cutting insert shown in FIG. 3.

According to the present invention, as shown in FIGS. 3 and 5, the cutting insert 20 has a median plane M located between the two opposing end surfaces 22, and a central boss 36 protruding from at least one of the two opposing end surfaces 22. Each central boss 36 has a raised support surface 38 located axially further away from the median plane M than any point on the three major cutting edges 30 located on the same side of the median plane M.

Configuring the cutting insert 20 with raised support surfaces 38 advantageously enables modification of the three cutting portions 26 to achieve multiple product variants without modifying the support surfaces 38.

In some embodiments of the present invention, each of the three cutting portions 26 may be radially spaced apart from the at least one central boss 36.

Also, in some embodiments of the present invention, as shown in FIG. 2, each central boss 36 may have three second points N2 contained in the three radial planes P1, and each second point N2 may be located the shortest distance between its respective central boss 36 and its respective first point N1.

Further, in some embodiments of the present invention, as shown in FIG. 2, each second point N2 may be located on a curved portion 76 of its respective central boss 36, and each curved portion 76 may be outwardly convex in relation to the central axis A1.

Configuring each curved portion 76 to be outwardly convex in relation to the central axis A1 advantageously enables cutting depths of internal grooving operations to be optimized.

Yet further, in some embodiments of the present invention, each of the three cutting portions 26 may have two minor cutting edges 40, each minor cutting edge 40 extending away from its associated major cutting edge 30 in a direction towards the median plane M.

As shown in FIGS. 3 and 5, both end surfaces 22 may have a central boss 36, such that the cutting insert 20 has a total of two central bosses 36.

In some embodiments of the present invention, as shown in FIG. 3, each support surface 38 may be substantially planar and perpendicular to the central axis A1.

Configuring each support surface 38 to be planar and perpendicular to the central axis A1 advantageously facilitates accurate and repeatable indexing of the cutting insert 20.

Also, in some embodiments of the present invention, as shown in FIGS. 3 and 5, each support surface 38 may be the axially outermost surface of its associated end surface 22.

As shown in FIG. 3, the median plane M may be perpendicular to the central axis A1.

In some embodiments of the present invention, the median plane M may intersect the peripheral side surface 24 along the whole of the perimeter of the peripheral side surface 24.

Also, in some embodiments of the present invention, as shown in FIG. 3, the cutting insert 20 may exhibit mirror symmetry about the median plane M. In such embodiments, the cutting insert 20 is reversible and can advantageously be suitable for both left and right-handed cutting tools.

According to the present invention, in an end view of the cutting insert 20, as shown in FIG. 2, each of the three abutment recesses 28 is visible and at least partially located inside a first imaginary circle C1 circumscribing the visible central boss 36. The first imaginary circle C1 has a first diameter D1.

Configuring the cutting insert 20 with the three abutment recesses 28 inside the first imaginary circle C1 advantageously enables the cutting insert 20 to be stably secured to a mating body with an efficient use of space.

In some embodiments of the present invention, each of the three abutment recesses 28 may be visible in both end views of the cutting insert 20.

Also, in some embodiments of the present invention, each of the three abutment recesses 28 may intersect each central boss 36.

In alternative embodiments of the present invention (not shown), each central boss may comprise three spaced apart protrusions having coplanar support sub-surfaces.

As shown in FIG. 2, the three major cutting edges 30 may define a second imaginary circle C2 having a second diameter D2 which circumscribes the peripheral side surface 24.

In some embodiments of the present invention, the center of the second imaginary circle C2 may be coincident with the central axis A1.

Also, in some embodiments of the present invention, the first diameter D1 may be equal to or less than two thirds of the second diameter D2, i.e. $D1 \leq \frac{2}{3} D2$.

Further, in some embodiments of the present invention, each curved portion 76 may have a radius equal to or smaller than the radius of the second imaginary circle C2.

Configuring the radius of each curved portion 76 to be equal to or smaller than the radius of the second imaginary circle C2 advantageously enables cutting depths of internal grooving operations in small diameter bores to be optimized.

In an end view of the cutting insert 20, as shown in FIG. 2, a third imaginary circle C3 may contain the visible central boss 36 and exactly two of the three cutting portions 26.

In some embodiments of the present invention, the second and third imaginary circles C2, C3 may have the same second diameter D2, and an offset distance O between the centers of the second and third imaginary circles C2, C3 may be equal to or greater than a quarter of their second diameter D2, i.e. $O \geq D2/4$.

In an end view of the cutting insert 20, as shown in FIGS. 2 and 4, each of the three abutment recesses 28 may have a pair of spaced apart abutment surfaces 44a, 44b forming a V-shape.

In some embodiments of the present invention, each pair of abutment surfaces 44a, 44b may be spaced apart by a curved joining surface 46, and each joining surface 46 may contain the radially innermost point of its associated abutment recess 28.

Also, in some embodiments of the present invention, each abutment surface 44a, 44b may contain a straight imaginary abutment line $L_A$ parallel to the central axis A1.

Further, in some embodiments of the present invention, each abutment surface 44a, 44b may be substantially planar, and in a cross-section of the cutting insert 20 taken in a plane perpendicular to the central axis A1, as shown in FIG. 4, each pair of abutment surfaces 44a, 44b may form an external recess angle β having a value between 60 and 120 degrees, i.e. $60° < \beta < 120°$.

Yet further, in some embodiments of the present invention, the recess angle β between each pair of abutment surfaces 44a, 44b may have a value between 60 and 120 degrees in any cross-section of the cutting insert 20 taken in a plane perpendicular to the central axis A1.

In some embodiments of the present invention, each end surface 22 may include a lower surface 48 extending radially inwardly from each of the three cutting portions 26.

As shown in FIG. 5, each lower surface 48 may be axially closer to the median plane M than a portion of the major cutting edge 30 of its associated cutting portion 26.

Also, as shown in FIG. 5, each lower surface 48 may be substantially planar and perpendicular to the central axis A1, and each lower surface 48 may define a lower plane P2 which intersects the major cutting edge 30 of its associated cutting portion 26.

Figure 6:
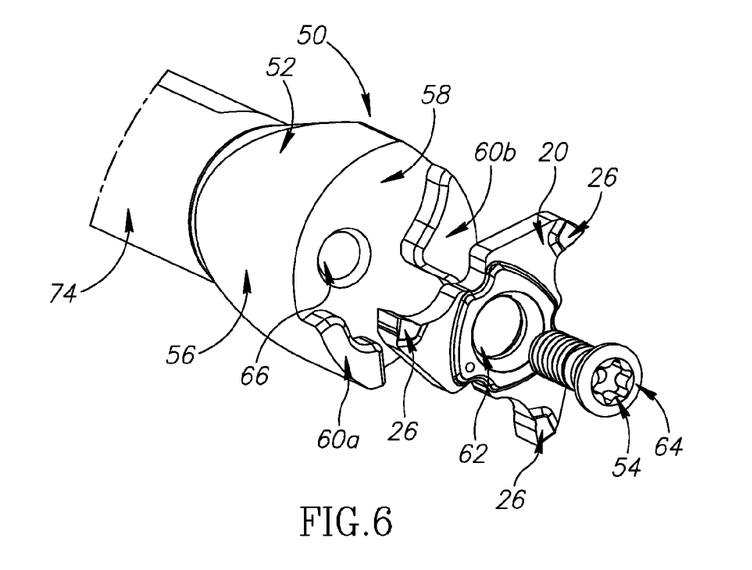
FIG. 6 is an exploded perspective view of a cutting tool in accordance with some embodiments of the present invention.
Figure 7:
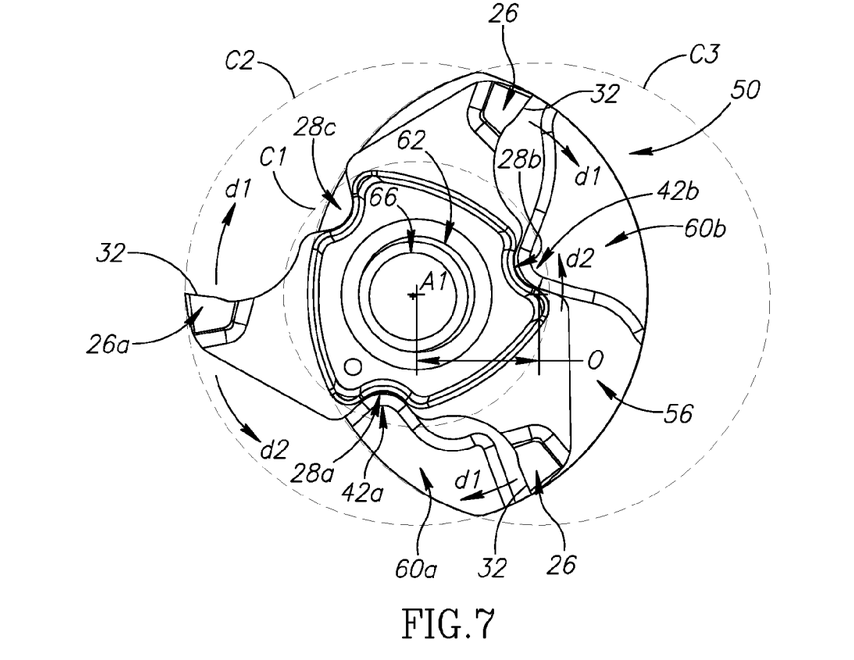
FIG. 7 is an end view of the cutting tool shown in FIG. 6, with the fastener removed.

Attention is now drawn to FIGS. 6 and 7 showing a cutting tool 50 according to the present invention, comprising an insert holder 52 and at least one cutting insert 20.

The at least one cutting insert 20 is removably secured to the insert holder 52 by means of a fastener 54.

Figure 8:
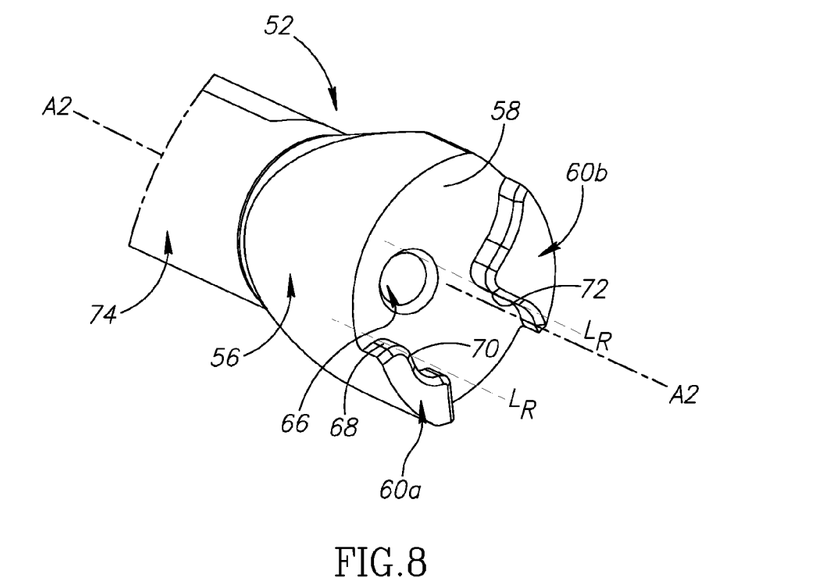
FIG. 8 is a perspective view of an insert holder in accordance with some embodiments of the present invention.
Figure 9:
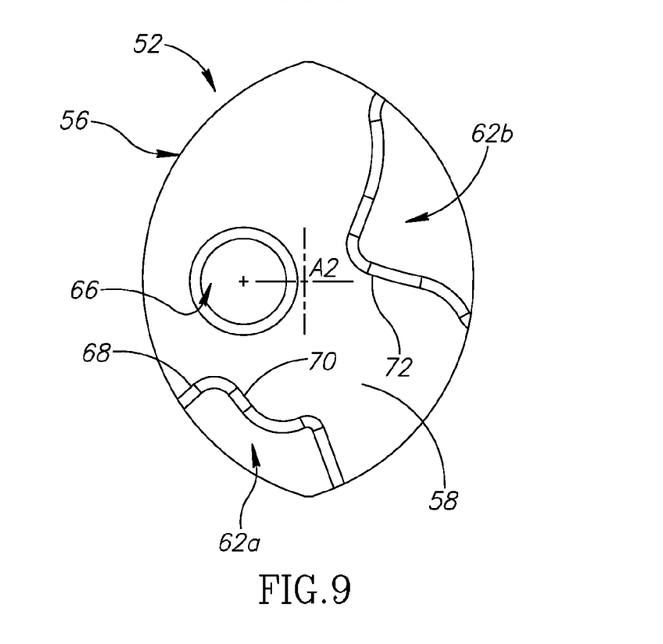
FIG. 9 is an end view of the insert holder shown in FIG. 8.

As shown in FIGS. 8 and 9, the insert holder 52 has a holding portion 56 extending along a longitudinal tool axis A2, and the holding portion 56 has a seating surface 58 transverse to the longitudinal tool axis A2, with at least one protuberance 60a, 60b protruding from the seating surface 58.

In some embodiments of the present invention, the seating surface 58 may be substantially planar and perpendicular to the longitudinal tool axis A2.

According to the present invention, as shown in FIG. 7, exactly one cutting portion 26 of each cutting insert 20 is operative, one support surface 38 of each cutting insert 20 is in clamping contact with the seating surface 58, and exactly two of the three abutment recesses 28 of each cutting insert 20 are engaged with the at least one protuberance 60a, 60b.

In some embodiments of the present invention, as shown in FIG. 7, exactly two spaced apart corner portions 42a, 42b of the at least one protuberance 60a, 60b may be located inside the first imaginary circle C1 of each cutting insert 20.

Also, in some embodiments of the present invention, as shown in FIGS. 2 and 7, each cutting insert 20 may comprise a central bore 62 extending coaxially with its central axis A1.

Further, in some embodiments of the present invention, the central bore 62 may be visible in both end views of the cutting insert 20.

Yet further, in some embodiments of the present invention, as shown in FIG. 6, the fastener 54 may be in the form of a clamping screw 64 extending through the cutting insert's central bore 62 and engaging a threaded bore 66 in the seating surface 58 of the holding portion 56.

As shown in FIG. 7, the rake surfaces 32 of each cutting insert 20 may generally face in a first circumferential direction d1 about the central axis A1, and the exactly two abutment recesses 28 of each cutting insert 20 engaging with the at least one protuberance 60a, 60b may be the first and second closest abutment recesses 28a, 28b to its operative cutting portion 26a in an opposite second circumferential direction d2 about its central axis A1. Meanwhile, the closest abutment recess 28c in the first circumferential direction d1 about the central axis A1 remains unengaged.

Configuring the cutting tool 50 such that the first closest abutment recess 28a to its operative cutting portion 26a in the second circumferential direction d2 engages with the at least one protuberance 60a, 60b can advantageously support the operative cutting portion 26a and absorb operational cutting forces.

In some embodiments of the present invention, both of the abutment surfaces 44a, 44b associated with the first closest abutment recess 28a to its operative cutting portion 26a in the second circumferential direction d2 may be in clamping contact with the at least one protuberance 60a, 60b, and only one of the abutment surfaces 44a associated with the second closest abutment recess 28b to its operative cutting portion 26a in the second circumferential direction d2 may be in clamping contact with the at least one protuberance 60a, 60b.

Also, in some embodiments of the present invention, the two abutment surfaces 44a, 44b associated with the first closest abutment recess 28a to its operative cutting portion 26a in the second circumferential direction d2 may be in clamping contact with corresponding first and second reaction walls 68, 70 of the at least one protuberance 60a, 60b, and the single abutment surface 44a associated with the second closest abutment recess 28b to its operative cutting portion 26a in the second circumferential direction d2 may be in clamping contact with a corresponding third reaction wall 72 of the at least one protuberance 60a, 60b, and each of the first, second and third reaction walls 68, 70, 72 may contain a straight imaginary reaction line $L_R$ parallel to the longitudinal tool axis A2.

As shown in FIG. 7, the single abutment surface 44a in clamping contact with the third reaction wall 72 may generally face in the second circumferential direction d2 about its central axis A1.

In some embodiments of the present invention, each threaded bore 66 may be eccentric in relation to its respective central bore 62. In such embodiments, tightening of the clamping screw 64 within its threaded bore 66 urges each cutting insert 20 in a transverse direction with respect to the longitudinal tool axis A2, thus ensuring clamping contact between three of its abutment surfaces 44a, 44b and three corresponding reaction walls 68, 70, 72.

Also, in some embodiments of the present invention, as shown in FIGS. 6 and 7, exactly one cutting insert 20 may be secured to the insert holder 52, exactly two spaced apart protuberances 60a, 60b may protrude from the seating surface 58, and the first and second reaction walls 68, 70 may be located on a first protuberance 60a and the third reaction wall 72 may be located on a second protuberance 60b. In such embodiments, the first protuberance 60a has a first corner portion 42a and the second protuberance 60b has a second corner portion 42b.

Configuring the insert holder 52 with exactly two spaced apart protuberances 60a, 60b advantageously enables the single cutting insert 20 to be secured to the insert holder 52 with an efficient use of space.

In some embodiments of the present invention, having exactly one cutting insert 20 secured to the insert holder 52, the holding portion 56 may be elongated and longitudinally extend away from a shank portion 74.

In an end view of the cutting tool 50, as shown in FIG. 7, the second imaginary circle C2 may contain the entire holding portion 56.

Also, in an end view of the cutting tool 50, as shown in FIG. 7, the third imaginary circle C3 may contain the entire holding portion 56.

As the offset distance O between the centers of the second and third imaginary circles C2, C3 may be equal to or greater than a quarter of their second diameter D2, i.e. O≥D2/4, the cutting tool 50 can advantageously be used to perform internal groove turning operations at cutting depths equal to or greater than a quarter of the bore diameter of the workpiece within which the holding portion 56 extends.

In alternative embodiments of the present invention (not shown), the cutting tool may have a plurality of cutting inserts removably secured to the seating surface of the insert holder, and the cutting tool may be rotatable about the longitudinal tool axis and used in groove milling operations.

Although the present invention has been described to a certain degree of particularity, it should be understood that various alterations and modifications could be made without departing from the spirit or scope of the invention as hereinafter claimed.

What is claimed is:

1. An indexable cutting insert (20) comprising:
two opposing end surfaces (22) with a peripheral side surface (24) and a central axis (A1) extending therebetween,
a median plane (M) located between the two opposing end surfaces (22),
exactly three cutting portions (26), each cutting portion (26) having a major cutting edge (30) extending from one end surface (22) to the other end surface (22),
exactly three abutment recesses (28) in the peripheral side surface (24), at least a portion of each abutment recess (28) being formed within a peripheral recess (33) which includes a rake surface (32) of an associated major cutting edge (30), and
a central boss (36) protruding from at least one of the two opposing end surfaces (22),
wherein each central boss (36) has a raised support surface (38) located axially further away from the median plane (M) than any point on the three major cutting edges (30) located on the same side of the median plane (M), and
wherein in an end view of the cutting insert (20) each of the three abutment recesses (28) is visible and located inside a first imaginary circle (C1) circumscribing the central boss (36).

2. The cutting insert (20) according to claim 1, wherein each support surface (38) is substantially planar and perpendicular to the central axis (A1).

3. The cutting insert (20) according to claim 1, wherein each of the three abutment recesses (28) intersects each central boss (36).

4. The cutting insert (20) according to claim 1, wherein each support surface (38) is the axially outermost surface of its associated end surface (22).

5. The cutting insert (20) according to claim 1, wherein in both end views of the cutting insert (20), each of the three abutment recesses (28) is visible.

6. The cutting insert (20) according to claim 1, wherein each of the three abutment recesses (28) has a pair of spaced apart abutment surfaces (44a, 44b) forming a V-shape in an end view of the cutting insert (20).

7. The cutting insert (20) according to claim 6, wherein each pair of abutment surfaces (44a, 44b) is spaced apart by a curved joining surface (46), and
wherein each joining surface (46) contains the radially innermost point of its associated abutment recess (28).

8. The cutting insert (20) according to claim 6, wherein each abutment surface (44a, 44b) contains a straight imaginary abutment line ($L_A$) parallel to the central axis (A1).

9. The cutting insert (20) according to claim 6, wherein each abutment surface (44a, 44b) is substantially planar, wherein in a cross-section of the cutting insert (20) taken in a plane perpendicular to the central axis (A1) each pair of abutment surfaces (44a, 44b) forms an external recess angle (β), and
wherein the recess angle (β) has a value between 60 and 120 degrees.

10. The cutting insert (20) according to claim 1, wherein the median plane (M) intersects the peripheral side surface (24) along the whole of the perimeter of the peripheral side surface (24).

11. The cutting insert (20) according to claim 1, wherein the median plane (M) is perpendicular to the central axis (A1).

12. The cutting insert (20) according to claim 1, wherein the cutting insert (20) is indexable about the central axis (A1).

13. The cutting insert (20) according to claim 1, wherein the cutting insert (20) exhibits mirror symmetry about the median plane (M).

14. The cutting insert (20) according to claim 1, wherein the three major cutting edges (30) define a second imaginary circle (C2) having a second diameter (D2) which circumscribes the peripheral side surface (24).

15. The cutting insert (20) according to claim 14, wherein the center of the second imaginary circle (C2) is coincident with the central axis (A1).

16. The cutting insert (20) according to claim 14, wherein the first imaginary circle (C1) has a first diameter (D1), and
wherein the first diameter (D1) is equal to or less than two thirds of the second diameter (D2).

17. The cutting insert (20) according to claim 14, wherein in an end view of the cutting insert (20) a third imaginary circle (C3) contains the visible central boss (36) and exactly two of the three cutting portions (26), wherein the second and third imaginary circles (C2, C3) have the same second diameter (D2), and
wherein an offset distance (O) between the centers of the second and third imaginary circles (C2, C3) is equal to or greater than a quarter of their second diameter (D2).

18. The cutting insert (20) according to claim 1, wherein each of the three cutting portions (26) has a radial plane (P1) containing the central axis (A1) and a first point (N1) on its respective major cutting edge (30), and
wherein each central boss (36) has three second points (N2) contained in the three radial planes (P1) and each second point (N2) is located the shortest distance between its respective central boss (36) and its respective first point (N1).

19. The cutting insert (20) according to claim 18, wherein each second point (N2) is located on a curved portion (76) of its respective central boss (36), and
wherein each curved portion (76) is outwardly convex in relation to the central axis (A1).

20. The cutting insert (20) according to claim 19, wherein the three major cutting edges (30) define a second imaginary circle (C2) which circumscribes the peripheral side surface (24), and
wherein each curved portion (76) has a radius equal to or smaller than the radius of the second imaginary circle (C2).

21. An indexable cutting insert (20) comprising:
two opposing end surfaces (22) with a peripheral side surface (24) and a central axis (A1) extending therebetween,
a median plane (M) located between the two opposing end surfaces (22),
exactly three cutting portions (26), each cutting portion (26) having a major cutting edge (30) extending from one end surface (22) to the other end surface (22),
exactly three abutment recesses (28) in the peripheral side surface (24), and
a central boss (36) protruding from at least one of the two opposing end surfaces (22),
wherein each central boss (36) has a raised support surface (38) located axially further away from the median plane (M) than any point on the three major cutting edges (30) located on the same side of the median plane (M),
wherein in an end view of the cutting insert (20) each of the three abutment recesses (28) is visible and located inside a first imaginary circle (C1) circumscribing the central boss (36);
wherein each of the three major cutting edges (30) is formed by the intersection of a rake surface (32) and a clearance surface (34), and wherein the rake and clearance surfaces (32, 34) are located on the peripheral side surface (24);
wherein each of the three cutting portions (26) has a radial plane (P1) containing the central axis (A1) and a first point (N1) on its respective major cutting edge (30),
wherein each radial plane (P1) forms an acute internal clearance angle (α) with a straight imaginary clearance line ($L_C$) tangential to the clearance surface (34) immediately adjacent its respective first point (N1), and
wherein the acute clearance angle (α) has a value equal to or greater than 75 degrees; and
wherein, in an end view of the cutting insert, at least a portion of the rake surface (32) of each cutting portion (26) is located on the same side of its respective radial plane (P1) as the adjacent clearance surface (34).

22. The cutting insert (20) according to claim 1, wherein each of the three cutting portions (26) is radially spaced apart from the at least one central boss (36).

23. The cutting insert (20) according to claim 1, wherein each end surface (22) includes a lower surface (48) extending radially inwardly from each of the three cutting portions (26).

24. The cutting insert (20) according to claim 23, wherein each lower surface (48) is axially closer to the median plane (M) than a portion of the major cutting edge (30) of its associated cutting portion (26).

25. The cutting insert (20) according to claim 23, wherein each lower surface (48) is substantially planar and perpendicular to the central axis (A1), and
wherein each lower surface (48) defines a lower plane (P2) which intersects the major cutting edge (30) of its associated cutting portion (26).

26. The cutting insert (20) according to claim 1, wherein the three cutting portions (26) are circumferentially and radially spaced apart from the three abutment recesses (28).

27. The cutting insert (20) according to claim 1, wherein the three cutting portions (26) are circumferentially equally spaced about the central axis (A1) alternating with the three abutment recesses (28).

28. The cutting insert (20) according to claim 1, wherein all of the three cutting portions (26) are identical.

29. The cutting insert (20) according to claim 1, wherein all of the three abutment recesses (28) are identical.

30. The cutting insert (20) according to claim 1, wherein the cutting insert (20) exhibits rotational symmetry about the central axis (A1).

31. The cutting insert (20) according to claim 1, wherein a central bore (62) extends coaxially with the central axis (A1).

32. The cutting insert (20) according to claim 31, wherein the central bore (62) is visible in both end views of the cutting insert (20).

33. A cutting tool comprising an insert holder (52), and at least one indexable cutting insert (20) retained therein; wherein:
the insert holder (52) has a holding portion (56) extending along a longitudinal tool axis (A2), the holding portion (56) having a seating surface (58) transverse to the longitudinal tool axis (A2), with at least one protuberance (60a, 60b) protruding from the seating surface (58),
the at least one indexable cutting insert (20) comprises:
two opposing end surfaces (22) with a peripheral side surface (24) and a central axis (A1) extending therebetween,
a median plane (M) located between the two opposing end surfaces (22),
exactly three cutting portions (26), each cutting portion (26) having a major cutting edge (30) extending from one end surface (22) to the other end surface (22),
exactly three abutment recesses (28) in the peripheral side surface (24), and
a central boss (36) protruding from at least one of the two opposing end surfaces (22),
wherein each central boss (36) has a raised support surface (38) located axially further away from the median plane (M) than any point on the three major cutting edges (30) located on the same side of the median plane (M),
wherein in an end view of the cutting insert (20) each of the three abutment recesses (28) is visible and located inside a first imaginary circle (C1) circumscribing the central boss (36);
the at least one cutting insert (20) is removably securable to the insert holder (52) by means of a fastener (54),
wherein exactly one cutting portion (26) of each cutting insert (20) is operative,
wherein one support surface (38) of each cutting insert (20) is in clamping contact with the seating surface (58), and
wherein exactly two of the three abutment recesses (28) of each cutting insert (20) are engaged with the at least one protuberance (60a, 60b).

34. The cutting tool (50) according to claim 33, wherein exactly two spaced apart corner portions (42a, 42b) of the at least one protuberance (60a, 60b) are located inside the first imaginary circle (C1) of each cutting insert (20).

35. The cutting tool (50) according to claim 33, wherein each of the three cutting portions (26) of each cutting insert (20) has a rake surface (32) generally facing in a first circumferential direction (d1) about the central axis (A1), and wherein the exactly two abutment recesses (28) of each cutting insert (20) engaging with the at least one protuberance (60a, 60b) are the first and second closest abutment recesses (28a, 28b) to the cutting insert's operative cutting portion (26a) in an opposite second circumferential direction (d2) about its central axis (A1).

36. The cutting tool (50) according to claim 35, wherein each of the three abutment recesses (28) of each cutting insert (20) has a pair of spaced apart abutment surfaces (44a, 44b) forming a V-shape in an end view of each cutting insert (20), wherein both of the abutment surfaces (44a, 44b) associated with the first closest abutment recess (28a) to its operative cutting portion (26a) in the second circumferential direction (d2) are in clamping contact with the at least one protuberance (60a, 60b), and wherein only one of the abutment surfaces (44a) associated with the second closest abutment recess (28b) to its operative cutting portion (26a) in the second circumferential direction (d2) is in clamping contact with the at least one protuberance (60a, 60b).

37. The cutting tool (50) according to claim 36, wherein the two abutment surfaces (44a, 44b) associated with the first closest abutment recess (28a) to its operative cutting portion (26a) in the second circumferential direction (d2) are in clamping contact with corresponding first and second reaction walls (68, 70) of the at least one protuberance (60a, 60b), wherein the single abutment surface (44a) associated with the second closest abutment recess (28b) to its operative cutting portion (26a) in the second circumferential direction (d2) is in clamping contact with a corresponding third reaction wall (72) of the at least one protuberance (60a, 60b), and wherein each of the first, second and third reaction walls (68, 70, 72) contains a straight imaginary reaction line ($L_R$) parallel to the longitudinal tool axis (A2).

38. The cutting tool (50) according to claim 37, wherein the single abutment surface (44a) in clamping contact with the third reaction wall (72) generally faces in the second circumferential direction (d2) about its central axis (A1).

39. The cutting tool (50) according to claim 37, wherein exactly one cutting insert (20) is secured to the insert holder (52), wherein exactly two spaced apart protuberances (60a, 60b) protrude from the seating surface (58), and wherein the first and second reaction walls (68, 70) are located on a first protuberance (60a) and the third reaction wall (72) is located on a second protuberance (60b).

40. The cutting tool (50) according to claim 33, wherein the seating surface (58) is substantially planar and perpendicular to the longitudinal tool axis (A2).

41. The cutting tool (50) according to claim 33, wherein each cutting insert (20) comprises a central bore (62) extending coaxially with its central axis (A1), and wherein the fastener (54) is in the form of a clamping screw (64) extending through the cutting insert's central bore (62) and engaging a threaded bore (66) in the seating surface (58) of the holding portion (56).

42. The cutting tool (50) according to claim 41, wherein each threaded bore (66) is eccentric in relation to its respective central bore (62).

43. The cutting tool (50) according to claim 33, wherein exactly one cutting insert (20) is secured to the insert holder (52), and wherein the three major cutting edges (30) define a second imaginary circle (C2) having a second diameter (D2) which circumscribes its peripheral side surface (24).

44. The cutting tool (50) according to claim 43, wherein the holding portion (56) is elongated and longitudinally extends away from a shank portion (74), and wherein in an end view of the cutting tool (50) the second imaginary circle (C2) contains the entire holding portion (56).

45. The cutting tool (50) according to claim 44, wherein in an end view of the cutting tool (50) a third imaginary circle (C3) contains the entire holding portion (56), and wherein the second and third imaginary circles (C2, C3) have the same second diameter (D2) and an offset distance (O) between the centers of the second and third imaginary circles (C2, C3) is equal to or greater than a quarter of their second diameters (D2).

* * * * *